(12) United States Patent
Plamann et al.

(10) Patent No.: US 7,385,709 B2
(45) Date of Patent: Jun. 10, 2008

(54) MICROSCOPY IMAGING APPARATUS AND METHOD FOR GENERATING AN IMAGE

(75) Inventors: Karsten Plamann, Lausanne (CH); Stéphane Bourquin, Lausanne (CH); Mathieu Ducros, Lausanne (CH); Jelena Mitic, Lausanne (CH); Francois Vuille, Lausanne (CH); Theo Lasser, Lausanna (CH); Tiemo Anhut, Lausanne (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 259 days.

(21) Appl. No.: 10/501,637

(22) PCT Filed: Jan. 15, 2003

(86) PCT No.: PCT/IB03/00510

§ 371 (c)(1),
(2), (4) Date: Feb. 16, 2005

(87) PCT Pub. No.: WO03/060587

PCT Pub. Date: Jul. 24, 2003

(65) Prior Publication Data

US 2005/0117172 A1   Jun. 2, 2005

(30) Foreign Application Priority Data

Jan. 15, 2002   (GB)   ................... 0200819.1

(51) Int. Cl.
*G01B 11/24* (2006.01)
(52) U.S. Cl. .................. 356/604; 356/605; 356/603

(58) Field of Classification Search ............... 356/604, 356/35.5, 484, 512–514, 605, 618, 489; 250/550, 250/573–576, 201.7
See application file for complete search history.

(56) References Cited

U.S. PATENT DOCUMENTS 4,584,484 A   4/1986   Hutchin (Continued)

FOREIGN PATENT DOCUMENTS

JP   2001117010   4/2001

(Continued)

OTHER PUBLICATIONS

Bourquin et al., "Linear Smart Detector Array for Video Rate Optical Coherence Tomography," CLEO/Europe EQEC Focus Meetings, Munich, Jun. 1999.

(Continued)

*Primary Examiner*—Gregory J. Toatley, Jr.
*Assistant Examiner*—Tri Ton
(74) *Attorney, Agent, or Firm*—Dann, Dorfman, Herrell and Skillman, P.C.

(57) ABSTRACT

A method and a microscopy imaging apparatus for generating an optically sectioned image of a specimen are provided. The method comprises the steps of: illuminating the specimen with a modulating, spatially periodic illumination pattern; imaging said specimen on a conjugate image plane; acquiring a plurality of signals at respective positions on said image plane, each signal corresponding to the incident light intensity at that position and having an oscillatory component caused by the modulation of the illumination pattern; and measuring a characteristic of the oscillatory component of each of the signals, whereby the measured characteristics when combined in their relative positions generate an optically sectioned image of the specimen.

20 Claims, 3 Drawing Sheets

U.S. PATENT DOCUMENTS

Figure 1:
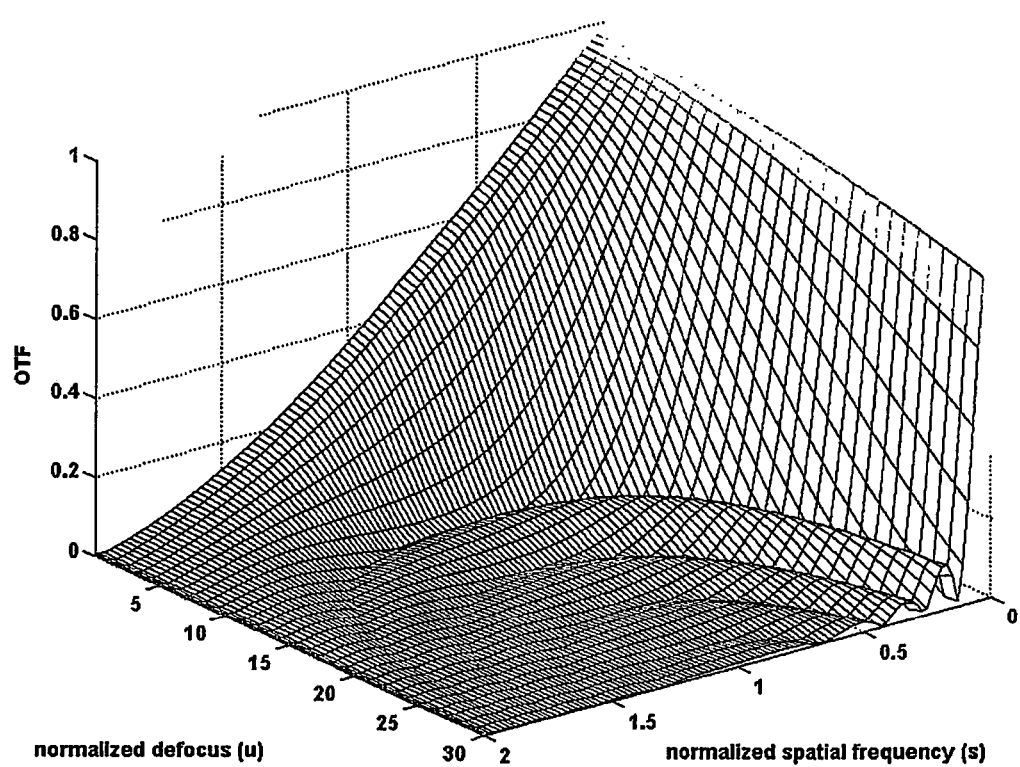

| | | | |
|---|---|---|---|
| 4,794,550 A * | 12/1988 | Greivenkamp, Jr. | 702/167 |
| 5,381,236 A | 1/1995 | Morgan | |
| 5,598,265 A * | 1/1997 | de Groot | 356/512 |
| 5,867,604 A | 2/1999 | Ben-Levy et al. | |
| 6,128,077 A | 10/2000 | Jovin et al. | |
| 6,208,416 B1 * | 3/2001 | Huntley et al. | 356/606 |
| 6,239,909 B1 | 5/2001 | Hayashi et al. | |
| 6,690,474 B1 * | 2/2004 | Shirley | 356/603 |

FOREIGN PATENT DOCUMENTS

| | | |
|---|---|---|
| JP | 2001330555 | 11/2001 |

OTHER PUBLICATIONS

Bourquin et al., "Video Rate Optical Low Coherence Tomography Based on a Linear Smart Detector Array," LEOS98 Electro-Optic Sensors & Systems.

Bourquin et al., "Video-Rate Optical Low-Coherence Reflectometry Based on a Linear Smart Detector Array," Optics Letters, vol. 25, No. 2, Jan. 2000.

R. Lange et al., "Time-of-flight range imaging with a custom solid-state image sensor," EUROPTO Conf. on Laser Metrology and Inspection, Munich Germany, Jun. 1999.

K. Creath et al., "Digital Fringe Pattern Measurement Techniques," Interferogram Analysis, copyright IOP Publishing Ltd. 1993.

P. Seitz, "Smart Pixels," Proceedings EDMO 2001/Vienna, copyright 2001 IEEE.

T. Spirig et al., "The Multitap Lock-In CCD with Offset Subtraction," IEEE Transactions on Electron Devices, vol. 44, No. 10, Oct. 1997.

T. Wilson et al., "Confocal microscopy by aperture correlation," Optics Letters, vol. 21, No. 23, Dec. 1, 1996.

D.W. Robinson and G.T. Reid (eds.), "Interferogram Analysis: Digital Fringe Pattern Measurement Techniques", Inst. of Physics Pub., Bristol and Phila., (1993). pp. 108-109.

* cited by examiner

MICROSCOPY IMAGING APPARATUS AND METHOD FOR GENERATING AN IMAGE

The present invention relates to a microscopy imaging apparatus and a method for generating an image, and in particular an apparatus and method for generating an optically sectioned image.

With a conventional wide-field microscope it is not possible to obtain a proper two-dimensional optically id sectioned image of a three dimensional specimen because the resultant image contains contributions from out-of-focus specimen structures above and below the specimen object plane which blur the image of the specimen object plane. Conventional wide-field microscopes are unable to reject these out-of-focus details.

To overcome this problem confocal microscopes have been developed. These devices use a point light source located in a plane which is optically conjugate to the specimen object plane. This arrangement allows-out-of-focus light to be rejected, but the illuminating light beam has to be laterally scanned to build up the optically sectioned image point-by-point. This leads to long acquisition times, particularly if it is desired to "stack" optically sectioned images obtained at successive focal positions to form a three dimensional image of the specimen. Also the light efficiency of such devices tends to be low.

In order to avoid scanning and to reduce acquisition times a number of approaches have been suggested. One of these involves the use of a Nipkow disk in which the pinhole is replaced by a multi-aperture rotating disk that enables parallel observation of several confocal volumes. Even so, only about 2% of the total illumination light budget is used for imaging.

In an attempt to overcome this problem, Verveer et al. (Verveer P. J., Gemkow M. J. and Jovin M., *J. Microscopy*, Vol. 189(3), (1998), 192-198), proposed replacing the Nipkow disk with a digital micro-mirror device which serves as a programmable pinhole array. The image thus-obtained consists of superimposed confocal and conventional images. The pure confocal contribution is recoverable by subtracting the conventional image, but at the cost of increasing noise.

WO 98/45745 discloses an alternative approach in which an object is illuminated by a periodic pattern and at least three specimen images are recorded at different spatial phases of the pattern. The three images are then combined by image processing which removes the periodic pattern and out-of-focus contributions, and thereby produces an optically sectioned image. However, this approach is not convenient for implementing real-time imaging.

An object of the present invention is to provide a method of generating an optically sectioned specimen image which, like conventional confocal techniques, comprises substantially only in-focus detail, but has a more favourable light budget and acquisition time. A further object is to provide a method of generating an optically sectioned specimen image which facilitates real-time imaging.

In a first aspect, the present invention provides a method of generating an optically sectioned image of a specimen comprising the steps of: illuminating the specimen with a modulating, spatially periodic illumination pattern; imaging said specimen on a conjugate image plane; acquiring a plurality of signals at respective positions on said image plane, each signal (which is typically an electrical signal) corresponding to the incident light intensity at that position and having an oscillatory component caused by the modulation of the illumination pattern; and measuring a characteristic (typically the amplitude) of the oscillatory component of each of the signals, whereby the measured characteristics when combined in their relative positions generate an optically sectioned image of the specimen. Thus, the present invention is based on the realisation that analysis of the temporal variation of the light from the specimen allows out-of-focus contributions to be rejected. Such analysis is amenable to automated processing, which opens the door to real-time imaging.

This is in contrast to the approach of WO 98/45745 where discrete images rather than temporal variations are analysed.

Preferably the method further comprises a step, between the acquisition and measuring steps, of filtering each acquired signal to isolate the oscillatory component therefrom.

Typically, the optically sectioned image will be pixellated, the value (e.g. brightness or colour value) of each image pixel being determined by the measured characteristic of the respective oscillatory component, and the position of each pixel corresponding to a respective position on the image plane.

The method may be repeated for different focal positions to produce a series of optically sectioned images of the specimen. These can then be combined to form a three-dimensional image of the specimen.

Preferably, the spatially periodic illumination pattern is modulated to produce a predetermined modulation frequency at respective specimen positions, whereby the oscillatory components of the signals acquired at corresponding positions on the image plane have substantially the same frequency. By the "modulation frequency" we mean the reciprocal of the time required for a position on the specimen to undergo one complete illumination cycle from light to dark and back to light again.

In preferred embodiments, the illumination pattern has one-dimensional periodicity. For example the pattern may be a fringe pattern e.g. comprising parallel linear fringes or concentric circular fringes. Such patterns have well-defined spatial periodicities and may be produced e.g. by interferometry or by an illuminated mask. They can also be modulated by moving or shifting the elements of the patterns in such a way to ensure that substantially all imaged specimen positions experience substantially equal modulation frequencies and time-integrated illumination intensities.

For example, a pattern of parallel linear fringes may be moved by shifting the fringes across the specimen in the direction lateral to the fringes, the modulation frequency is then the inverse of the time taken to shift the fringes by one fringe spacing. A pattern of concentric circular fringes may be moved by expanding the fringes away from or contracting them towards the common centre of the fringes, the modulation frequency being the inverse of the time taken for a fringe to grow (or shrink) to the size of the adjacent fringe.

Preferably, the illumination pattern is modulated to produce a modulation frequency of at least 100 Hz (more preferably of at least 1 kHz, 10 kHz or 100 kHz).

Typically the incident light at the image plane comprises reflected or transmitted light, and/or light emitted by the specimen (such as fluorescent light) in response to the illumination pattern.

A further aspect of the present invention provides a method of processing image data to generate an optically sectioned image comprising: (a) receiving data which comprises a plurality of signals previously acquired by performing the steps of (i) illuminating a specimen with a modulating, spatially periodic illumination pattern, (ii) imaging said specimen on a conjugate image plane, and (iii) acquiring a plurality of signals at respective positions on said image plane, each signal corresponding to the incident light intensity at that position and having an oscillatory component caused by the modulation of the illumination pattern; and (b) measuring a characteristic (typically the amplitude) of the oscillatory component of each of the signals, whereby the measured characteristics when combined in their relative positions generate an optically sectioned image of the specimen.

Thus this aspect of the invention relates to the processing of image data previously acquired by performing the illumination, imaging and acquisition steps of the previous aspect. Optional and preferred features of the previous aspect apply also to this aspect.

For example, the method may further comprise a step, between the receiving and measuring steps, of filtering each acquired signal to isolate the oscillatory component therefrom.

A further aspect of the invention provides a microscopy imaging apparatus comprising: illumination means for illuminating a specimen with a modulating, spatially periodic illumination pattern; imaging means for imaging said specimen on a conjugate image plane; acquisition means for acquiring a plurality of signals at respective positions on said image plane, each signal corresponding to the incident light intensity at that position and having an oscillatory component caused by the modulating illumination pattern; and processor means for measuring a characteristic (typically the amplitude) of the oscillatory component of each of the signals, whereby the measured characteristics when combined in their relative positions generate an optically sectioned image of the specimen.

Preferably the processor means also filters each acquired signal to isolate the oscillatory component therefrom prior to measuring the characteristic of the oscillatory component.

In one embodiment, the illumination means comprises means for generating a spatially periodic interference illumination pattern, such as may be generated by two overlapping coherent beams of light. The coherent beams of light may be produced by a laser or lasers.

Alternatively the illumination means may comprise a light source which illuminates the specimen through a patterned grid, the grid pattern corresponding to the illumination pattern. Such a source may be incoherent. Furthermore, it may illuminate the specimen with white light.

The acquisition means may comprise an array of light detectors for respectively detecting light intensity at the plurality of image plane positions. Typically such detectors operate in parallel. Suitable one- and two-dimensional signal detector arrays are described in EP-A-1065809. If a one-dimensional array is used, generation of a two-dimensional optically sectioned image requires the array to be scanned across the image plane. Preferably, however, a two-dimensional array is used so that light intensities across substantially the whole image plane are detected simultaneously. This reduces the image acquisition time.

With a two-dimensional array of detectors, each detector may acquire a signal corresponding to one pixel of a pixellated optically sectioned image. With a one-dimensional scanned array of detectors, each detector may acquire signals corresponding to a line of pixels of a pixellated optically sectioned image.

Preferably, the processor means comprises a plurality of signal processors for respectively measuring (and optionally filtering) the oscillatory components of the acquired signals. Typically the processors operate in parallel to reduce the image generation time.

More preferably, with an array of signal detectors, each signal detector has a dedicated signal processor, e.g. as described in EP-A-1065809. Thus signal acquisition, filtering and subsequent measurement can be fully automated.

Typically the illumination means modulates the illumination pattern to produce a predetermined illumination modulation frequency (e.g. of at least 100 Hz, 1 kHz, 10 kHz or 100 kHz). Preferably the processor means is adapted to filter the acquired signals at substantially the same frequency in order to isolate effectively the oscillatory components from the signals.

A further aspect of the invention provides a conversion kit for converting a conventional microscope into the microscopy imaging apparatus of the previous aspect, the conversion kit comprising: illumination means for illuminating a specimen with a modulating, spatially periodic illumination pattern; acquisition means for acquiring a plurality of signals at respective positions on a conjugate image plane onto which the microscope images the specimen, each signal corresponding to the incident light intensity at that position and having an oscillatory component caused by the modulating illumination pattern, and processor means for measuring a characteristic (typically the amplitude) of the oscillatory component of each of the signals, whereby the measured characteristics when combined in their relative positions generate an optically sectioned image of the specimen.

Preferably the processor means filters each acquired signal to isolate the oscillatory component therefrom prior to measuring the characteristic of the oscillatory component.

The kit may have other preferred or optional features corresponding to preferred or optional features of the microscopy imaging apparatus of the previous aspect.

Figure 2:
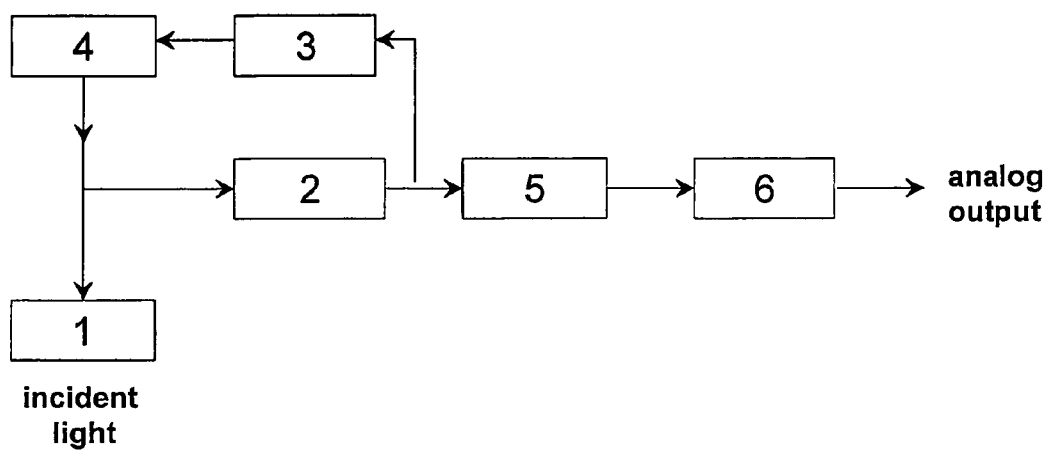
Figure 3:
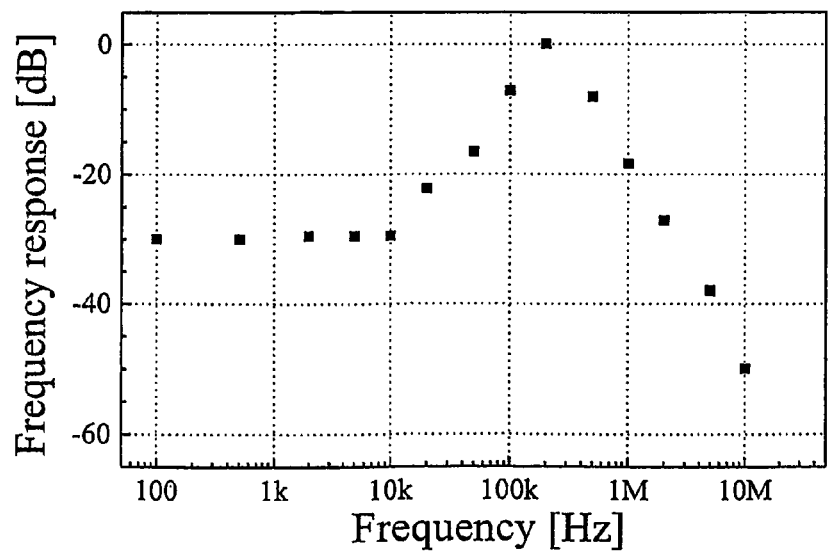
Figure 4:
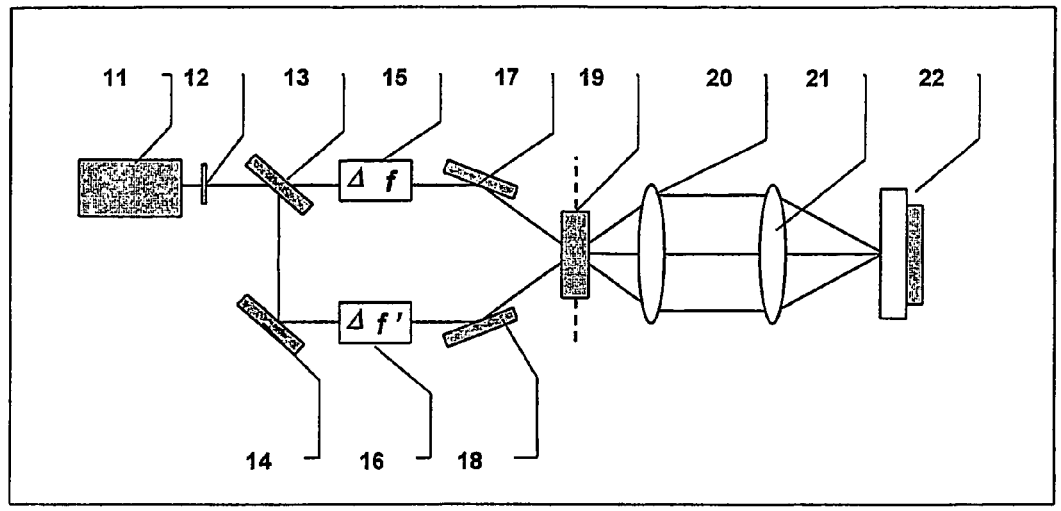
Figure 5:
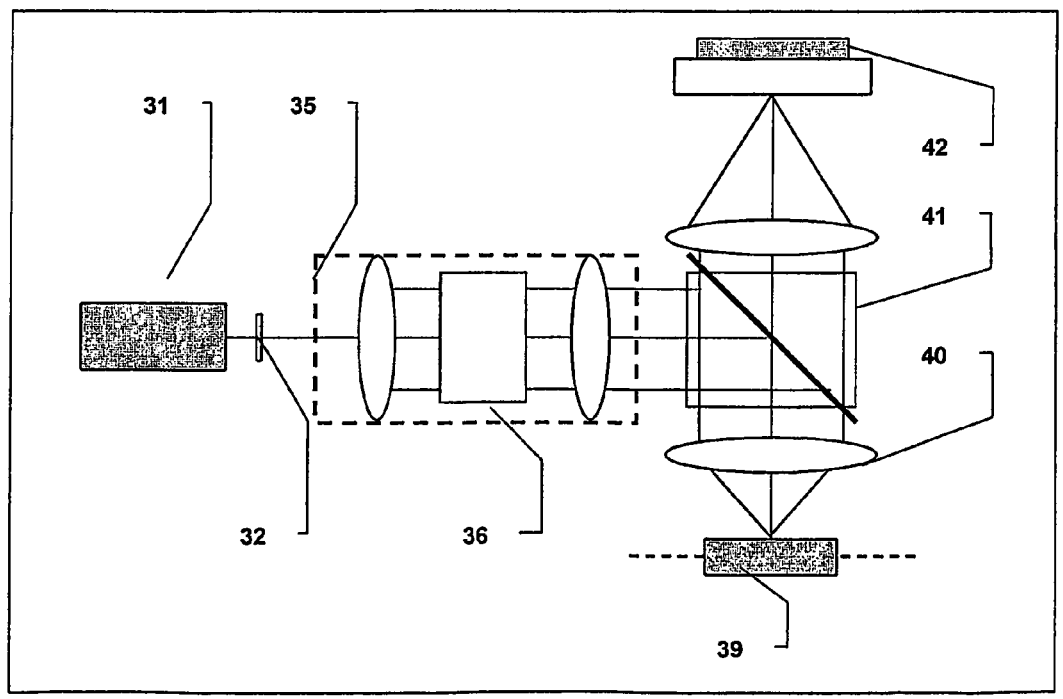

Specific embodiments of the present invention will now be described with reference to the accompanying drawings in which:

FIG. 1 shows the absolute value of the optical transfer function OTF as a function of the generalised distance to the focal plane $u=4\pi w/\lambda$ and the generalised spatial frequency $\upsilon=\lambda/(n \sin \alpha.f)$, FIG. 2 is a flow chart which shows schematically the signal detection and processing steps performed by a detector/processor pair of an amplitude demodulation detector array (ADDA), FIG. 3 shows a typical detector/processor pair frequency response, FIG. 4 shows a microscopy imaging apparatus according to a first embodiment of the present invention, and FIG. 5 shows a microscopy imaging apparatus according to a second embodiment of the present invention.

A spatially periodic illumination pattern comprising linear parallel fringes may be formed e.g. by interference between two mutually coherent light beams. The interference fringes are formed by planes of uniform illumination intensity extending essentially parallel to the optical axis. Thus on any plane perpendicular to the optical axis (such as the focal plane) the fringes appear as an interference pattern having a period given by the magnitude of the wave shift vector, $\Delta \vec{K} = \vec{k}_1 - \vec{k}_2$, resolved onto that plane, where $\vec{k}_1$ and $\vec{k}_2$ being the k-vectors of the two laser beams.

The resulting specimen illumination intensity, $I_{ex}$, is given by:

$$I_{ex}(\vec{r}, \phi) = 1 + \cos(2\Delta \vec{K} \vec{r} + \phi),$$

where $\vec{r}$ is a position vector in a plane perpendicular to the optical axis, and φ is the phase lag produced when the fringes are modulated by being shifted in a direction lateral to the fringes. The value of φ is thus a function of time, t. For, example, if f is the illumination modulation frequency, the fringes are moved laterally by a whole fringe period in a time 1/f, so φ=2πtf.

The illumination pattern causes (e.g. reflected, transmitted or fluorescent) light to originate from the specimen, the light having an intensity which is proportionate to $I_{ex}$ and also to the specimen three-dimensional optical object structure, $o(\vec{r})$. Thus the image intensity, $I_{im}$, can be written as:

$$I_{im}(\vec{r}, \varphi) = o(\vec{r})I_{ex}(\vec{r}, \varphi) * p(\vec{r}),$$

where $p(\vec{r})$ is the incoherent point spread function and * denotes a convolution.

In k-space this can be written as:

$$I_{im}(\vec{k}, \varphi) = O(\vec{k})P(\vec{k}) + \frac{1}{2}\left[e^{i\varphi}O(\vec{k}+\Delta\vec{K}) + e^{-i\varphi}O(\vec{k}-\Delta\vec{K})\right]P(\vec{k}),$$

where $\vec{k}$ is reciprocal distance, $P(\vec{k})$ is the optical transfer function (OTF), and O is the image frequency spectrum. The first term, $O(\vec{k})P(\vec{k})$, corresponds to an image obtained using a conventional microscope, while the second term contains the image frequency spectrum shifted towards higher spatial frequencies. Only the second term is dependent on the phase lag, φ, of the fringe system. Effectively, the first term may be thought of as a DC component and the second term may be thought of as an AC or oscillatory component.

In the second term, the frequency shifted image spectrum is multiplied by the OTF. FIG. 1 shows the absolute value of the OTF according to an approximation given by Stokseth (A. Stokseth, *Journal of the Optical Society of America*, Vol. 59(10), (1969), 1314-1321) as a function of the generalised distance to the focal plane u=4πw/λ and the generalised spatial frequency v=λ/(n sin α.f), where w is the optical path length, λ is the optical wavelength, n sin α is the numerical aperture and f is the spatial frequency. Out-of-focus contributions (i.e. contributions originating from specimen positions distant from the focal plane) are attenuated much more heavily than in-focus contributions (i.e. when u=0).

The theoretical model discussed above is based on the well-known approach of describing imaging in terms of reciprocal k-space. For simplicity we have used the example of coherent illumination. However incoherent illumination can be adopted in a straightforward manner instead. For example, the linear parallel fringes may be formed by illuminating an appropriate mask and imaging the mask onto a focal plane coincident with the specimen.

Consistent with the theoretical model, we can also describe the optical sectioning effect achieved by the present invention by a simple qualitative model in real x-y-z space, where the optical axis corresponds to the z-axis. Effectively, the moving periodic illumination pattern is only "visible" (in the sense of having strong contrast) in the imaged specimen within an optically sectioned volume which extends across an x-y plane. The visibility of the pattern drops off sharply along the optical axis in other x-y planes to either side of the optically sectioned volume. That is, away from the optically sectioned volume the pattern washes out and eventually forms non-periodic background illumination which contributes to the above-mentioned DC component.

Thus moving out of focus means loosing fringe contrast and movement. Hence only those parts of the specimen within the optically sectioned volume modify (e.g. by reflection, transmission or fluorescence) the illuminating light in such a way as to result in a light signals which have oscillatory components. These can be measured as AC signals which can then be used to construct an optically sectioned image.

Thus optical sectioning can be achieved by locating an array of light detectors on the conjugate image plane and splitting the signal acquired at each detector into a DC and an AC component. The DC component corresponds to the time-invariant conventional microscope image and can be ignored, whereas the AC signal carries substantially only in-focus spatial frequency components and can be used to generate an optically sectioned image.

A suitable detector array is the amplitude demodulation detector array (ADDA) described in EP-A-1065809. The ADDA is formed on a silicon chip as a two-dimensional array of photo sensor light detectors and corresponding integrated circuit signal processors. Each signal/processor pair corresponds to one pixel of the final optically sectioned image whereby effectively instantaneous acquisition of a complete image can be achieved.

An advantage of using ADDAs is that all the signal processing functions can be performed by integrated circuitry on the silicon chips. ADDAs also have low sensitivity to power fluctuations.

FIG. 2 is a flow chart which shows schematically the signal acquisition and processing steps performed by each detector/processor pair of an ADDA. The photosensor 1 captures the light and generates a corresponding electrical signal. The amplifier 2 together with the low-pass filter 3 and current source 4 provide a feedback loop which results in the rejection of the DC component of the electrical signal and amplification of the AC component. The AC component is then rectified at rectifier 5 and a final stage low-pass filter 6 further filters and smoothes the AC component.

The analog output of the detector/processor pair is therefore effectively a measurement of the amplitude of the AC component, and can then be sent to an analog/digital converter for combination with the outputs from the other pairs into the optically sectioned image. The image may be displayed, for example, on a video monitor (with the AC component amplitude measurements converted into e.g. pixel brightness levels) or stored on a computer-readable memory device (such as a hard disc, RAM, CD etc.).

FIG. 3 shows a typical detector/processor pair frequency response. The response provides DC signal suppression and an AC signal pass band which has a maximum frequency response at about 200 kHz. For optimum compatibility with an ADDA array formed of such pairs, the, illumination pattern should be modulated so that the illumination modulation frequency is 200 kHz.

An advantage of such a frequency response is that image noise contributions for the conventional microscope image are also suppressed.

FIG. 4 shows a microscopy imaging apparatus according to a first embodiment of the present invention. Light is produced by a coherent light-source 11 such as a laser, and is optionally attenuated by an optional attenuator 12. This light is split into two parallel beams at beam separator 13 and mirror or prism 14. Next, phase or frequency shifting elements 15 and 16 respectively operate on the beams. The two shifted beams are then recombined by mirrors 17 and 18 at the specimen 19 to form a continuously moving periodic illumination pattern which provides a uniform illumination modulation frequency at each point on the specimen 19.

The light from the specimen is then imaged through lenses 20 and 21 (which may be for example a conventional wide field microscope observation stage arranged in transmission or reflection configuration) onto a two-dimensional ADDA array 22, each detector/processor pair of the ADDA array having a maximum response frequency tuned to the illumination modulation frequency.

FIG. 5 shows a microscopy imaging apparatus according to a second embodiment of the present invention. In this embodiment, light is produced by an incoherent light source 31, before being optionally attenuated by optional attenuator 32. A periodic illumination pattern is generated by a mask 36 contained in housing 35 and located at an intermediate image position conjugated to the object. The pattern is imaged onto specimen 39 via the objective lens 40 of a conventional microscope observation optics 41. The mask is moved laterally by a piezo-element (not shown) to shift the image of the illumination pattern relative to the specimen. The observation optics then form an image of the specimen from scattered or emitted light at a two-dimensional ADDA array 42 located at a conjugate image plane.

The invention claimed is:

1. A method of generating an optically sectioned image of a specimen comprising the steps of:
   illuminating the specimen with a temporally modulating, illumination pattern;
   imaging said specimen on a conjugate image plane;
   acquiring a plurality of signals at respective positions on said image plane, each signal corresponding to the incident light intensity at that position and having an oscillatory component caused by the modulation of the illumination pattern;
   filtering each acquired signal to isolate the oscillatory component therefrom,
   measuring a characteristic of the oscillatory component of each of the signals; and
   generating an optically sectioned image of the specimen by combining the measured characteristics in their relative positions;
   wherein the measuring and filtering steps are performed by a plurality of signal processors, each signal processor having a feedback loop provided by an amplifier, a low-pass filter and a current source, the feedback loop rejecting a time-invariant component of the respective acquired signal and amplifying the oscillatory component of that signal.

2. A method of generating an image according to claim 1, wherein the measured characteristic is the amplitude of the oscillatory component.

3. A method of generating an image according to claim 1, wherein the filtering step is performed without sampling the modulation frequency of the illumination pattern.

4. A method of generating an image according to claim 1, wherein the illumination pattern is a fringe pattern.

5. A method of generating an image according to claim 4, wherein the fringe pattern is an interference pattern.

6. A method of generating an image according to claim 1, wherein the illumination pattern is modulated by moving the illumination pattern relative to the specimen object plane.

7. A method of generating an image according to claim 1, wherein the illumination pattern is modulated to produce an illumination modulation frequency of at least 100 Hz.

8. A method of generating an image according to claim 1, wherein the incident light at the image plane comprises reflected or transmitted light.

9. A method of generating an image according to claim 1, wherein the incident light at the image plane comprises light which is emitted by the specimen in response to the illumination pattern.

10. A method of processing optical signals to generate an optically sectioned image comprising:
    receiving data which comprises a plurality of signals previously acquired by performing the steps of (i) illuminating a specimen with a temporally modulating illumination pattern, (ii) imaging said specimen on a conjugate image plane, and (iii) acquiring a plurality of signals at respective positions on said image plane, each signal corresponding to the incident light intensity at that position and having an oscillatory component caused by the modulation of the illumination pattern;
    filtering each acquired signal to isolate the oscillatory component therefrom,
    measuring a characteristic of the oscillatory component of each of the signals, and generating an optically sectioned image of the specimen by combining the measured characteristics when combined in their relative positions;
    wherein the measuring and filtering steps are performed by a plurality of signal processors, each signal processor having a feedback loop provided by an amplifier, a low-pass filter and a current source, the feedback loop rejecting a time-invariant component of the respective acquired signal and amplifying the oscillatory component of that signal.

11. An imaging apparatus comprising:
    illumination means for illuminating a specimen with a temporally modulating, illumination pattern;
    imaging means for imaging said specimen on a conjugate image plane;
    acquisition means for acquiring a plurality of signals at respective positions on said image plane, each signal corresponding to the incident light intensity at that position and having an oscillatory component caused by the modulating illumination pattern; and
    processor means for measuring a characteristic of the oscillatory component of each of the signals, whereby the measured characteristics when combined in their relative positions generate an optically sectioned image of the specimen;
    wherein the processor means comprises a plurality of signal processors for respectively measuring the characteristics of the oscillatory components of the acquired light signals, each signal processor having a feedback loop provided by an amplifier, a low-pass filter and a current source, the feedback loop rejecting a time-invariant component of the respective acquired signal and amplifying the oscillatory component of that signal.

12. An imaging apparatus according to claim 11, wherein the processor means also filters each acquired signal to isolate the oscillatory component therefrom before measuring the characteristic of the oscillatory component.

13. An imaging apparatus according to claim 12, wherein the illumination means modulates the illumination pattern to produce a predetermined modulation frequency and the processor means is adapted to filter the acquired signals at substantially the same frequency.

14. An imaging apparatus according to claim 11, wherein the illumination means comprises means for generating a spatially periodic interference illumination pattern.

15. An apparatus according to claim 11, wherein the acquisition means comprises an array of light detectors for respectively detecting the light intensities at the plurality of image plane positions.

16. An imaging apparatus according to claim 15, wherein the array of light detectors is a two-dimensional array.

17. An imaging apparatus according to claim 12, wherein the processor means filters each acquired signal without sampling the modulation frequency of the illumination pattern.

18. An imaging apparatus according to claim 11, wherein illumination means modulates the illumination pattern so that the modulation frequency is at least 100 Hz.

19. A conversion kit for converting a conventional microscope into the imaging apparatus of claim 11, the conversion kit comprising:

illumination means for illuminating a specimen with a temporally modulating illumination pattern;

acquisition means for acquiring a plurality of signals at respective positions on a conjugate image plane onto which the microscope images the specimen, each signal corresponding to the incident light intensity at that position and having an oscillatory component caused by the modulating illumination pattern, and processor means for measuring a characteristic of the oscillatory components of each of the signals, whereby the measured characteristics when combined in their relative positions generate an optically sectioned image of the specimen.

20. An imaging apparatus according to claim 11, wherein the measured characteristic is the amplitude of the oscillatory component.

* * * * *